United States Patent [19]
Clynes

[11] 3,755,922
[45] Sept. 4, 1973

[54] SYSTEM FOR PRODUCING PERSONALIZED SENTOGRAMS

[76] Inventor: Manfred Clynes, Lawrence Ln., Palisades, N.Y. 10964

[22] Filed: July 21, 1972

[21] Appl. No.: 274,070

[52] U.S. Cl. .............................. 35/22 R, 128/2 N
[51] Int. Cl. ......................................... G09b 19/00
[58] Field of Search ................. 35/22 R; 128/2.1 R, 128/2.1 B, 2.05 R, 2 N

[56] References Cited
UNITED STATES PATENTS

| | | | |
|---|---|---|---|
| 2,379,955 | 7/1945 | Einenberger | 128/2.1 R |
| 2,678,692 | 5/1954 | Ranseen | 35/22 R |
| 3,691,652 | 9/1972 | Clynes | 35/22 R |

*Primary Examiner*—Wm. H. Grieb
*Attorney*—Michael Ebert

[57] ABSTRACT

A system for producing a set of personalized sentograms constituting a personality relationship profile of the subject being diagnosed. The system includes a programmer presenting to the subject a predetermined sequence of names, each identifying an individual with whom the subject has a close relationship or about whom the subject has a distinct feeling. Each name presentation is repeated at random intervals or is followed by a series of short signals occurring at random times, commanding the subject to express his feeling about the named individual by a single physical action. Means are provided that are responsive to the physical action to produce a transient waveform representative thereof, the waveforms initiated by the series of signals being averaged to create a personalized sentogram. The set of sentograms resulting from the sequence of names provides a personality relationship profile of the subject.

7 Claims, 3 Drawing Figures

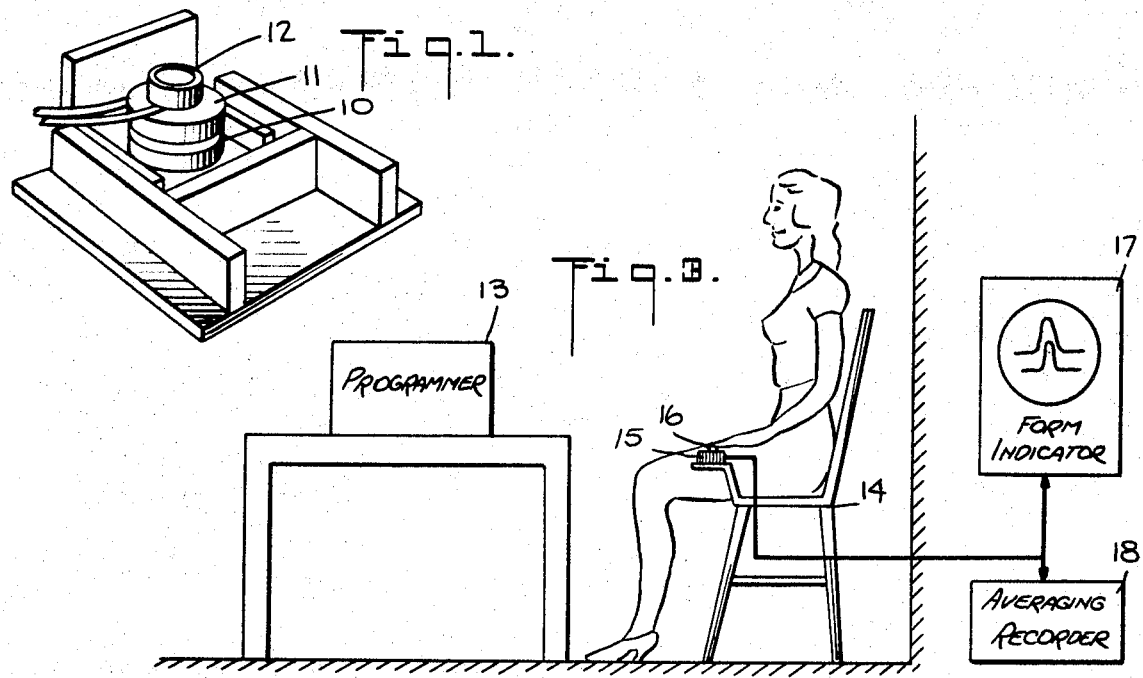
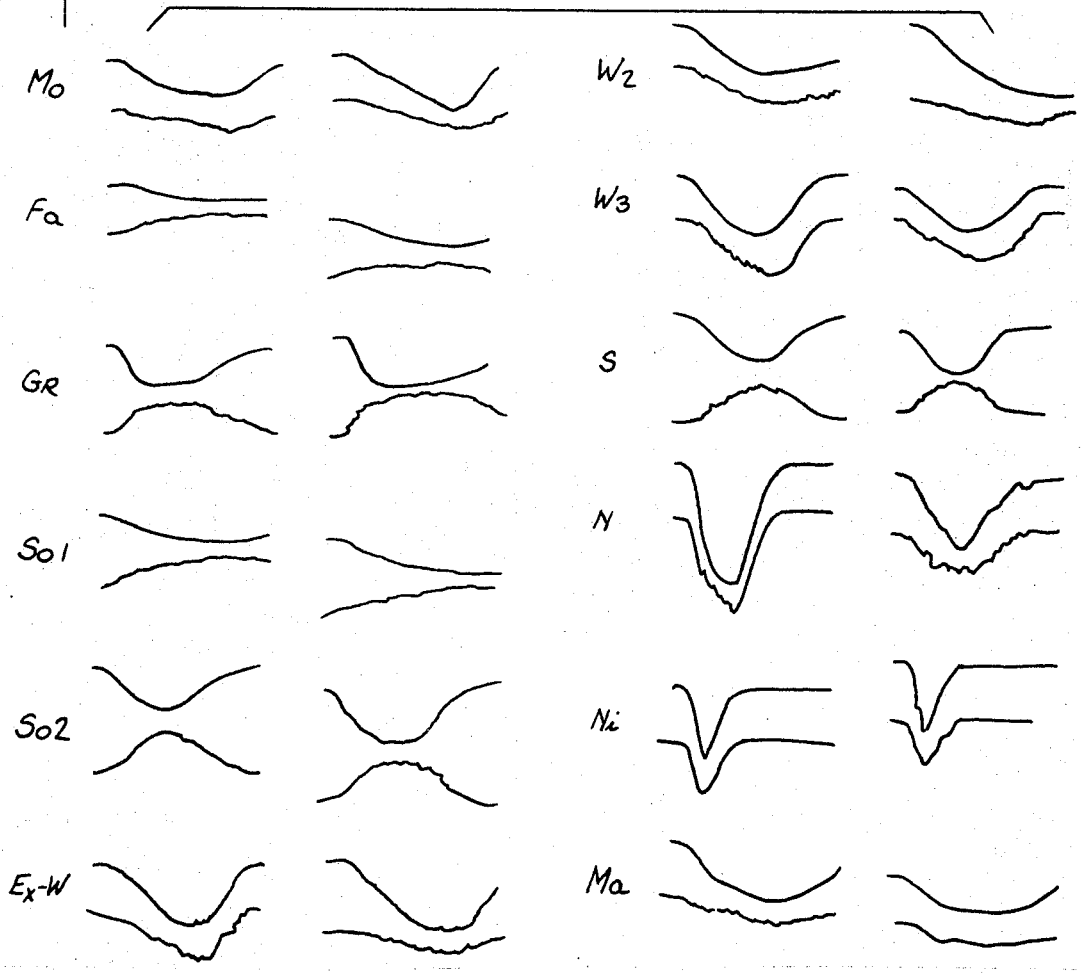

ND SENTOGRAMS

SYSTEM FOR PRODUCING PERSONALIZED SENTOGRAMS

RELATED APPLICATION

This application is related to my copending application Ser. No. 148,428, filed June 1, 1971, (now patent No. 3,691,652) entitled "Programmed System for Evoking Emotional Responses."

BACKGROUND OF THE INVENTION

This invention relates generally to mental diagnostic and prognostic techniques and apparatus therefor, and more particularly to a system for producing a set of personalized sentograms constituting a personality relationship profile of the subject tested.

A study of human emotions from the biocybernetic standpoint may be found in the text, "Biomedical Engineering Systems," edited by Clynes and Milsum (McGraw-Hill, 1970).

If one examines the physiologic concomitants of emotion, such as changes in heart rate, blood pressure, sweating and similar indices, one finds that a strict one-to-one correspondence is lacking between the changes and the emotion studied. Thus one individual may become pale when angry, another flushed, and even with the same person the physiologic responses are dissimilar at different times. These familiar observations reinforce the mistaken notion that emotions are vague, ill-defined and therefore defy rigorous scientific analysis. This attitude is further promoted by those theories of emotion that primarily define emotion through the physiologic experience of altered body functions.

It is well known that the words of language used to define emotional states are often ambiguous and do not denote many important and subtle aspects of emotion such as its time course, or dynamic aspects in general. Moreover, it is difficult to produce experimental conditions under which emotions are repeatedly and reliably produced in the same individual, or in different individuals. Habituation, expectancy and differences in interpretation interfere with the reproducibility of results.

On the other hand, artists and others with a strongly developed sense of inner discrimination have realized the high degree of precision of aspects of the emotional state and its communication. Such persons often consciously consider these states to be more precise than the words that are available to describe them.

The experimental results and theories presented in the above-identified Clynes and Milsum text reconcile these conflicting points of view and investigate the sources of precision. It is there demonstrated that the "idiologs" or brain algorithm programs of emotion states are highly precise, as are also the nature communication of expressive forms in the present moment of time.

The concept "idiolog" distinguishes a thought or idea of a quality and the associated brain process, as separate from the perception of it—e.g., the idea of a pitch, as compared with hearing it. The term idiolog denotes the thought or fantasy of a quality as a distinct psychophysiologic reality. An idiolog is an element of imagination which can be created in a moment, and has physiologic brain concomitants. Idiologs constitute a metalanguage of natural language insofar as the words of natural language are a correct translation of the physiologic code. We may distinguish three kinds of idiologs—sensory, affective, and motor idiologs.

The ensuing physiologic response may vary according to how much and what type of autonomic body functions are permitted to be included in the mode of experience concerned. This relationship varies as the nature of the experience partakes of fantasy or real aspects. A person may function emotionally only in terms of fantasy, by empathy or identification, or may be entirely involved himself.

In the studies reported in the above-identified text, the difficulties of measuring emotional characteristics quantitatively were overcome by normalizing expressions of emotion through measurement of touch-pressure transients in two dimensions produced by one finger of the subject, and by using generated fantasized emotion to evoke a response. By generating repetitive expressive acts for each emotion and averaging these acts on a computer, one derives from the transient pattern created by finger pressure, the expressive shape for the emotion.

The use of a single finger to produce expressive form implies the assumption that there exists a basic brain program for the expression of a given emotion, which makes it essentially immaterial whether a finger, foot or other body part is used in the expression—much as handwriting is also revealed by writing with the foot. The consistent results obtained with this measurement method confirms this supposition.

In order to clarify these aspects, we have introduced the terminology of sentic states. We may distinguish four kinds of modes of sentic states for each emotion. Thus for the emotion Anger, the following states exist:

Sentic State A. One experiences anger in himself in a real situation.

Sentic State B. This state is experienced as a reflection of anger in another person (a form of empathy).

Sentic State C. Anger is experienced as a fantasy.

Sentic State D. The anger is experienced vicariously through another's fantasy, as in watching theater or a movie, where one realizes the situation is not real.

Each one of these modes of sentic states has its own character and physiologic concomitants.

The expressive forms produced in the measurements previously referred to, are those arising from sentic state-C observations; i.e., the expressions of fantasy emotions. These states have clear physiologic concomitants—there may be tears for grief, flushing of face for love, and so on, and there are systematic alterations in heart rate, respiration and oxygen consumption. But more specifically, their dynamic expression appears to have an underlying basic brain algorithm or program which is genetically determined and similar for humans regardless of race, although the type of out expression chosen is culturally determined.

In my above-identified copending application, there is provided a system for the psychological and psychosomatic treatment of a subject, the system being adapted to generate generalized emotional states in the subject by means of a programmer presenting to the subject a series of words denoting emotions to be expressed, each word being followed by a series of start signals occurring at random points to initiate expressive action.

My earlier system includes a programmer functioning by means of a recording in audio or visual form, or a combination thereof, to present a subject being treated with a timed sequence of terms, each denoting a specific emotion, the sequence of terms preferably being such as to first define a series of negative emotions and progressing to a series of positive emotions, each word being followed by a series of randomly produced start signals to cause the subject, each time the signal is received, to apply a pressure with a body member in a manner which is best expressive of the announced emotion, the subject thereby undergoing and generating a sequence of sentic states in a programmed cycle.

The pressure applied by the subject may be presented in transient pattern form, having horizontal and vertical components, which form is exhibited to the subject or to a trained analyst to indicate whether an appropriate emotion has been expressed. Means may be provided under the control of the analyst to indicate the effectiveness of the response and to obtain a score representing the emotional progress made by the subject.

SUMMARY OF THE INVENTION

The main object of the present invention is to provide a novel technique and a system based on this technique, for producing a personality relationship profile of a subject being tested, the profile being useful in mental diagnoses and prognoses, and to monitor changes in personal relationships in the course of treatment.

More particularly, the object of this invention is to provide means for producing personalized sentograms derived from the averaged sentic responses of a subject to named individuals with whom the subject has a close relationship or about whom the subject has distinct feelings.

Thus, whereas in my prior system, a response was obtained and recorded with respect to basic emotions, such as anger, hate and love, in the present system, responses are evoked to such individuals as mother, father and son. Hence the present system does not sense the emotional reaction of a subject to basic emotions, but it records the subject's physical expression of emotion concerning an individual with whom he has a significant relationship.

By analyzing emotive components in a set of personalized sentograms produced by a subject in the light of basic emotion sentograms developed by the same subject or in terms of the universal basic emotion sentograms, one is able to evolve from this analysis, a personality relationship profile.

Briefly stated, these objects are attained in a system in which a programmer presents to the subject a predetermined sequence of names, each identifying an individual with whom the subject has a close relationship or about whom the subject has a distinct feeling. Each name presentation is repeated, say 10 times at random intervals, or followed by a series of start signals occurring at random times, commanding the subject to express his feeling about the named individual by a physical action.

Each physical action is converted into a corresponding transient waveform, the waveforms initiated by the series of signals being averaged to create a personalized sentogram. The set of sentograms resulting from the sequence of names presented by the programmer are collected to provide a personality relationship profile.

OUTLINE OF THE DRAWING

For a better understanding of the invention as well as other objects and further features thereof, reference is made to the following detailed description to be read in conjunction with the accompanying drawing, wherein:

FIG. 1 is a perspective view of a transducer assembly used in a system for producing personalized sentograms in accordance with the invention;

FIG. 2 is a series of personalized sentograms in accordance with the invention; and FIG. 3 is a block diagram of a preferred embodiment of a system in accordance with the invention.

DESCRIPTION OF THE INVENTION

Before considering how a system in accordance with the invention functions, we shall first review briefly the nature of essentic forms and the manner in which they have heretofore been measured.

Since the commands of the brain determined expressive shapes, it became possible to eliminate the difficult and varied measurement techniques presented by the different output possibilities (e.g., a smile, head movement, eyebrow movement, etc.) by standardization of the output in the form of a transient pressure touch (middle finger) on a two-dimensional pressure transducer assembly, as shown in FIG. 1. When this is done, results are indeed consistent and comparable, indicating the stability of the brain phenomenon giving rise to the shape.

The assembly shown in FIG. 1 is constituted by two pressure transducers 10 and 11, mounted at right angles to one another so as to have no cross interference, the pressure being applied to the transducers by a finger rest 12. Finger rest 12 is of a material having "grey" characteristics, that is a material affording a neutral touch sensation, i.e., neither particularly soft nor hard, neither particularly smooth nor rough. For this purpose, use may be made of a cup-shaped plastic body having a slight yieldability.

The transducer measuring horizontal force is biased with a constant pressure so that horizontal pressure measured may be either positive or negative, without losing contact. The transducers may be of the type used for pulse pressure measurement or may take the form of strain gauges. In practice, the finger rest may be formed with a socket or receptacle to receive an inserted finger, so that the transducer then may respond to upward as well as downward finger movement.

The subject in sitting position presses on the pressure transducer finger rest with his finger. The particular limb chosen does not essentially matter — the essentic form is a brain program, and can be executed by various effectors, such as the foot. For standardization, however, one should always use the same finger to eliminate secondary effects. Two components of this pressure are recorded (vertical and horizontal) giving time profiles of instantaneous pressure. This is the measure of the essentic form. The arm as a biologic filter eliminates activity not concerned with the form of the expressive act.

The subject is instructed to express with the greatest precision the quality of a sentic attitude evoked by names of persons, such as mother, father, son, sister, etc., by pressing the finger rest. The times at which he is to express is given to him by repeatedly saying the name or a series of soft clicks occurring randomly at 5–10 sec. intervals. The corresponding sentogram form outputs, i.e., the transient shapes recorded, are averaged on a CAT computer (computer of average transients) or by any commercially available device capable of averaging.

In this process, the subject, confronted by the name of a person, such as "father," is asked to generate in himself an algorithm—an idiolog of a sentic attitude——and repeatedly to express this with each action in as precise a manner as possible.

FIG. 2 illustrates typical personalized sentograms recorded in the manner previously described. In each sentogram, the upper trace is the vertical component of transient pressure, and the lower trace is the horizontal component of transient pressure. The fact that the emotive responses to different names give rise to different sentograms is immediately evident in FIG. 2. In each instance, the sentogram represents the average of the sentic responses by the subject being tested on two separate occasions.

Thus the pair of sentograms identified in FIG. 2, as "Mo," represent the averaged responses of the subject to the personalized term "Mother" on two separate occasions. The other sentogram pairs in FIG. 2 are identified by the following symbols:

| Personalized term | Symbol |
|---|---|
| Father | Fa |
| Grandfather | Gr |
| First Son | $So_1$ |
| Second Son | $So_2$ |
| Ex Wife | Ex-W |
| Second Woman Friend | $W_2$ |
| Third Woman Friend | $W_3$ |
| Male Friend | S |
| Business Enemy | N |
| Nixon | $N_1$ |
| Mao | Ma |

Though the sentograms, produced during the second test cycle differ somewhat from those produced during the first test cycle, the overall patterns are quite similar to each other.

In abstract sentograms of the type produced by the technique disclosed in my copending application, the sentic wave patterns express the subject's responses to basic emotions. Thus the feeling of love is expressed without regard to a particular individual that may be loved by the subject. As pointed out previously, these sentograms of basic emotions appear to arise from a specific brain program that is genetically determined and is similar for all subjects for a given subject. But while such sentograms appear to have a universal quality, for purposes of analyzing personalized sentograms produced by a given subject, one may also use for purposes of reference, a set of basic emotion sentograms developed by the same subject.

Personalized sentograms produced in accordance with the present invention reflect the subject's feeling about a specified individual with whom the subject has or has had a relationship, such as a member of his family or a business associate, or about whom the subject has an emotional attitude, such as a well-known political figure or a famous movie actress.

Hence when a set of basic emotion sentograms is developed by a subject, one has a record of the sentic patterns that reflect the emotional responses of the subject to such emotion — evoking terms as love, hate, anger, sex, joy and reverence. If now a set of personalized sentograms is developed by the same subject, one has available the sentic patterns representing the emotional attitude of the subject with respect to those individuals with whom the subject is closely related or about whom he has strong feelings. The expression of these feelings in sentic form is free of verbal dissimilation or intellectual distortion, for it is expressed at random intervals as an uninhibited physical expressive action whose form is averaged and recorded.

The total collection or set of personalized sentograms developed by a subject in response to a predetermined series of names is useful in characterizing his condition, for each personalized sentogram may be analyzed in the light of the basic emotion sentograms. For example, if the personalized sentogram for father (Fa) is quite similar to the essentic form or sentogram for "love," clearly the subject feels love for his father. But in many instances the personalized sentograms will reveal compound effects, such as fear-awe or hate-anger, in which event one finds in the personalized sentograms or hybrid forms of the abstract sentograms. The total collection of sentograms, therefore, lends itself to analysis to provide a personality relationship profile (PRP) of the subject. Thus a PRP diagnosis may reveal neurotic behavior patterns, homosexual tendencies, and other mental conditions that are difficult to detect by traditional techniques.

In order to produce personalized sentograms useful for diagnosis and prognosis, a system as shown in FIG. 3 is provided. This system is constituted by a programmer 13, which may take the form of a standard magnetic tape-recording and playback machine in cassette form.

Before a recording can be made, the subject must be interviewed in order to discover the scope and nature of his relationships. Thus a mature man separated from his wife and having, say, three children, a mistress, certain close friends, and business associates, will supply a list of names quite different from that supplied by a young, unmarried woman. The purpose of this interview is not to question the subject about his feelings toward individuals with whom he has a relationship, but only to identify these individuals preparatory to setting up a program appropriate to the subject.

When an appropriate list of names is obtained, a recording is made of the names on the list supplied by the subject, each name being followed by signals calling for a response to the name. These command signals preferably take the form of soft clicks. Thus pre-recorded on the cassette tape at spaced time positions are the names of individuals such as mother, father, son, etc., each name being followed by a series of soft command clicks occurring randomly, say at 3 to 15-second intervals, to avoid rhythmic actions that interfere with a spontaneous response. It is important that the clicks be neutral in character, that is, free of irritating or distracting qualities, so that the clicks merely initiate but do not affect the responses.

As pointed out previously, the series of names need not be recorded and in practice, the names may be announced by the experimentor and repeated at random intervals.

In producing personalized sentograms, the subject being treated is seated in a chair 14 having mounted thereon a pressure transducer assembly 15 provided with a finger rest 16. The proper positioning requires an upright position, with a straightback chair, perhaps a pillow behind the back, and a straight back. This has kinesthetic reasons, as well as preventing muscle tiredness. The body position was found to be an important factor influencing the effect of sentic states. It has an altered effect in an inclined or supine position.

The subject, when going through a cycle of names, has no objective means of knowing whether he is effectively expressing the emotions evoked by the names announced by the programmer. All he has available are his subjective reactions. However, by use of a transducer assembly 15 coupled to an oscilloscope 17 or other known on-time means for presenting the horizontal and vertical pressure components on a viewing screen, the subject is then able to see the actual transient pattern or sentic form of his response.

Though the subject is not trained to analyze these transient patterns, he will, in the course of time, learn to recognize these sentic forms resulting from the absence of an emotional response, or a poor or inhibited response as distinguished from the form arising from a genuine, well-defined feeling. Thus the subject, as he gains experience with the system, is able, by viewing the screen, to confirm those instances in the cycle in which he has effectively experienced and expressed a sentic state. These confirmations serve to bolster the confidence of the subject in his actions and act to encourage the subject toward greater freedom in reacting to the programmed cycle. Thus the transient pattern indicator 17 functions to stimulate the subject and to reinforce his participation in the program by providing feedback to the subject.

The transducer is also coupled to an averaging device and recorder 18, which serves to produce an output representing the average of the ten responses (or whatever number of repetitions is used) for each announced name, and to record the output to provide a personalized sentogram. The averaging device need not be electronic in nature and may take a mechanical or fluidic form, such as a moving wax strip passing under a pressure roller and caused to perform as a result of pressure applied by the subject. A pivoted pen writer is coupled to the roller, the pen being deflected across a recording paper in accordance with the depressions formed in the wax strip, which depressions have contours depending on the averaged pressures applied thereto. Or a magnetic disc may be used, the pressures applied during each of say ten responses being recorded on a separate parallel track. For read out and averaging, the ten tracks are sensed concurrently by a broad pick-up head. A mechanical system that produces repeated traces, one on top of the other, may be used for visual averaging.

While there has been shown and described a preferred embodiment of system for producing sentograms in accordance with the invention, it will be appreciated that many changes and modifications may be made therein without, however, departing from the essential spirit of the invention. Thus, the method disclosed above for developing a personality relationship profile may also be used to measure the sentic responses to environmental factors, such as colors, shapes, sounds, images and odors. Thus one may produce man-environment profiles which reflect the subject's relationship to environmental factors. In practice, the series of colors, shapes or images may be presented on a screen. Sounds, of course, may be presented by way of a recording and odors by means of suitable odor generators. The relationship between personalized sentograms and basic emotion sentograms may be analyzed by computer techniques.

I claim:

1. A system for producing a set of personalized sentograms to provide a personality relationship profile of a given subject, said system comprising:
   A. a programmer to present to the subject a predetermined sequence of names, each denoting an individual with whom the subject has a relationship or about whom the subject has a decided feeling, each name being repeatedly announced at random intervals or being followed by a series of start signals occuring at random times, each announcement of start signals commanding the subject to express his feeling about the named individual by a physical action,
   B. means responsive to said physical action to produce a transient sentic waveform representative thereof, and
   C. means to average the waveforms initiated by said commands and to record an averaged waveform constituting a personalized sentogram, the set of sentograms resulting from the sequence of names providing said personality relationship profile.

2. A system as set forth in claim 1, wherein said programmer is an audio playback device and includes a record of said names and said signals, said signals being constituted by audible clicks.

3. A system as set forth in claim 1, wherein said means responsive to said physical action is a transducer assembly having horizontal and vertical pressure-responsive elements associated with a finger rest.

4. A system as set forth in claim 1, further including means to visually indicate each of the sentic waveforms.

5. A system as set forth in claim 4, wherein said means is an oscilloscope.

6. A system as set forth in claim 1, wherein said means to average the sentic waveforms is a computer of average transients.

7. A system as set forth in claim 1, wherein said means to average the sentic waveforms is a mechanical device that is adapted to produce repeated traces one on top of the other to effect visual averaging.

* * * * *